Patented June 22, 1937

2,084,588

UNITED STATES PATENT OFFICE 2,084,588

MAGNESIA INSULATION AND METHOD OF MAKING SAME

Lewis B. Miller, Plainfield, N. J., assignor to Johns-Manville Corporation, New York, N. Y., a corporation of New York No Drawing. Application November 22, 1935, Serial No. 51,087

7 Claims. (Cl. 106—18)

This invention relates to magnesia insulation, particularly to so-called 85% magnesia, and the method of making the same.

It is an object of the present invention to provide a method of manufacture and a magnesia insulation resulting therefrom that, for a given strength, is less dense than magnesia insulation heretofore made from a chemically comparable composition. Other objects and advantages will appear from the detailed description that follows.

The invention comprises the novel features hereinafter described, and especially the step which includes precipitating magnesium basic carbonate predominantly in non-crystalline or gelatinous form, providing a mixture of such precipitate with asbestos fibres, and shaping the said mixture while the basic carbonate is largely in the form stated. In a preferred embodiment of the invention, the gelatinous precipitate of basic magnesium carbonate is produced and preserved by conducting the boiling or heating process, that gives the precipitate, at a lower maximum temperature than heretofore used and then cooling the precipitated material, to minimize the formation and growth of crystals therein.

My improved method may be used in connection with the conventional 85% magnesia manufacturing process modified as described.

It will be understood that the term "85% magnesia" is applied to a thermal insulating material comprising approximately 15 parts by weight of asbestos and 85 parts of magnesium basic carbonate.

The conventional process of making 85% magnesia comprises the following steps:

There is prepared a solution of magnesium bicarbonate in water that is approximately saturated with carbon dioxide gas at a pressure that is suitably atmospheric or higher. Usually the solution contains 1.0 to 2.0% by weight of dissolved magnesia, calculated as magnesium bicarbonate.

The solution of magnesium bicarbonate in water containing carbon dioxide is then submitted to a treatment to cause conversion of the dissolved magnesium bicarbonate to magnesium basic carbonate. This treatment usually comprises boiling, by which is meant raising the temperature of the solution to such a point that carbon dioxide gas escapes rapidly and the basic carbonate is precipitated. The temperature of boiling will vary with the stage of the boiling process, being relatively low at first and then increasing to approximately the boiling point of water when most of the carbon dioxide has been expelled.

It is conventional to mix the precipitated basic carbonate with the desired proportion of asbestos fibres and then to submit the mixture to shaping and partial dehydration. This shaping and dehydration may be effected by forcing the wet mixture or slurry, by air or pump pressure, into a filter-mold, that is, a mold with filtering sides adapted to permit outflow of water. The solid material is retained within the filtering sides of the mold.

Following the molding operation, the molded article is removed and finished in steps which include drying and then, suitably, sizing to the exact dimensions and form desired, as by sawing or cutting.

In the usual process described above, the magnesia passes through several transformations. Thus, it is believed, the magnesium bicarbonate, during the early stages of the heating or boiling operation, say, up to a temperature of about 150° F., is converted to hydrated magnesium carbonate, $MgCO_3.3H_2O$, and this product in the final stage of the boiling process is converted to magnesium basic carbonate having a ratio of magnesia to carbon dioxide expressed in the formula $5MgO.4CO_2$. It is not necessary to the invention that this statement of the theory of the basic magnesium carbonate formation or the formulas given should be correct.

The magnesium basic carbonate in the finished product obtained by the conventional process described is largely crystalline, as is also the product formed in the initial part of the heating operation and stated above to be probably magnesium carbonate containing three molecules of water of crystallization.

I have now discovered an intermediate product, of specially useful properties, between these two crystal modifications and a means of preserving largely this intermediate product until after the shaping of the mixture of asbestos fibres and precipitate, with attendant improvement in the properties of the finished magnesia insulation.

This intermediate product is predominantly non-crystalline or gelatinous.

It is obtained as a chief product of the boiling or heating operation, when the said operation is conducted under slightly less severe conditions than formerly prevailed. For instance, the desired gelatinous product predominates in the precipicate when the heating operation is conducted at a maximum temperature not substantially in excess of 190 to 200° F., the exact temperature selected depending, in part, upon the freedom with which the carbon dioxide evolved, as a by-product of the heating, is allowed to escape from the system. Thus, when the carbon dioxide is allowed to escape from an open-top tank, the temperature of heating may be limited to about 180 to 190° F. When, on the other hand, the tank has a cover and the evolved carbon dioxide may escape only through a small vent, then the temperature of heating may be higher, say, as high as approximately 200° F.

The exact temperature of heating depends also, in part, upon the time of exposure to the maximum temperature. The longer the period of exposure to the maximum temperature, the lower, within limits, should be the maximum temperature used. The temperature ranges given above apply suitably to the condition in which the liquid is heated approximately to the maximum temperature for a relatively short period, say, about twenty minutes or less.

The temperature of heating is relatively low, that is, slightly lower than used to produce the precipitate of basic carbonate in crystalline form, the temperature referred to being the maximum reached during the boiling or heating to precipitate the basic carbonate.

Using a selected maximum temperature, the heating operation is best conducted in such manner as to give incomplete precipitation of the dissolved magnesia. Instead of precipitating practically all, say, about 97% of the magnesia in the conventional process, I leave in solution a relatively large amount, say, a fifth to a half or more of the total magnesia content.

In this manner, there is produced, as stated, a precipitate that is gelatinous or substantially non-crystalline but that appears in the ratio of magnesia to carbon dioxide content to be practically the same as the crystalline product obtained as the final result of the usual boiling process.

Either before or after the heating described, asbestos fibres in selected proportion are introduced. Regardless of the stage of the process, at the time the fibres are introduced, there is made finally a mixture including the fibres, precipitated basic carbonate, and water. The mixture is fluent.

Preferably there is added, also, a small proportion of a water-soluble soap, say, 0.1% on the weight of total solids, at about the time the asbestos is introduced. A suitable soap is one containing saponified tallow and red oil, including sodium oleate, stearate and the like.

The mixture is then cooled promptly, as by being allowed to flow down an open trough to the equipment in which is effected the next step in the manufacturing process. Thus, the mixture may be lowered in temperature by about 10° F. or so, as it is caused to flow to a gravity or other filter.

This cooling retards the formation and growth of crystals in the gelatinous precipitate present in the said mixture.

In the filter there is effected separation from the mixture of a large proportion of the water present.

After this separation is made, the remaining mass including gelatinous basic carbonate of magnesium, asbestos, and water is formed into a thick creamy fluent mixture, as by agitation with a minimum proportion of water. Conveniently, the separation is made in a large tank with filtering bottom and sides, and the said creamy mixture may be formed by means of a stream of water directed against the mass remaining in the tank, now provided with an open vent in the bottom, in such manner as to wash the settled mass from the tank.

The resulting mixture is delivered to filtering molds of conventional type. The mixture is there filtered under pressure, as, for instance, at 30 to 60 pounds to the square inch, so that the molds are filled and excess of water is separated, to leave filter cakes that are shape-retaining and suitably of the approximate size and shape desired in finished units of the insulating material.

These residual cakes are then transferred to proper supports, of sheet metal or the like, and subjected to a drying operation, as in a drying oven or tunnel at a temperature that is somewhat above the boiling point of water, say, at about 225 to 325° F.

Once the mass of gelatinous basic magnesium carbonate, asbestos, and water is shaped under pressure in the molds, the gelatinous precipitate has served its functions; it is well adhered to the asbestos fibres and it occupies a volume that is large in proportion to its weight, possibly due to the retention by the gel of a larger proportion of water than would be retained at this stage by magnesium basic carbonate crystals.

Regardless, therefore, of the changes that may be produced in the gel by the subsequent drying of the molded product, the product made as described has an unexpectedly low density for a given strength. Thus, for compositions of comparable chemical composition, molded under the same conditions and having approximately the same modulus of rupture, the article made by the improved method, including the formation of the basic carbonate in gel form and retaining this form largely up to and including the molding operation, is substantially lower in overall density. In typical preparations, the product of the improved method is lighter by approximately 15%.

The effect of the seemingly small changes in the manufacturing method upon the morphology of the precipitate has been confirmed by me as the result of extensive study of X-ray diffraction patterns given by my precipitate as formed under relatively mild heating conditions and the conventional precipitate formed at a slightly higher temperature. The X-ray pattern for the conventional precipitate shows a number of well defined bands or lines on a photographic film, thus proving crystal structure, whereas the pattern of my precipitate shows no such bands. Further studies have revealed that, during the final stages of finishing my improved article, including the heating at an elevated temperature to produce drying, there is conversion of the original gelatinous material to crystals.

By "non-crystalline", as used herein, is meant a form of the precipitate of basic carbonate that shows no lines in a conventional X-ray diffraction pattern or shows no substantial proportion of crystals on microscopic examination.

For some purpose, the precipitation, on heating the magnesia solution, may be so conducted as to give some crystalline magnesium basic carbonate mixed with the gelatinous material described, as, for instance, by making the precipitation at a slightly higher temperature than that stated as preferred.

While the invention is not limited to any particular method of forming the magnesium bicarbonate solution that is subjected to heating as described, I have used to advantage dolomite as the source of the magnesia.

When dolomite is used, it is calcined, to produce a mixture of magnesium and calcium oxides.

This mixture is suspended in a large volume of water, with accompanying slaking of the lime and conversion of some of the magnesium oxide to hydroxide. The suspension is then subjected to carbonation, as by bubbling carbon dioxide therethrough, to convert the magnesia largely to the form of dissolved magnesium bicarbonate and leave the lime largely in the form of undissolved calcium carbonate. The carbonated mixture is then settled or filtered, to form a clarified solution of the magnesium liquor, that is, one that is freed from substantially all but the small proportion of calcium compounds dissolved in the solution and a trace of undissolved calcium component that may remain suspended.

After the separation is completed, the magnesium bicarbonate liquor so prepared is then subjected to heating, as described, to precipitate gelatinous basic carbonate as described.

In my relatively mild boiling or precipitation step, there is left unprecipitated a considerable amount of magnesia which is separated from the precipitated magnesium basic carbonate, all as stated previously. There may thus be formed a filtrate containing an amount of magnesia that is large and should be saved. To save this magnesia liquor separated from the precipitated basic carbonate, I cool the liquor and substitute it for approximately an equal volume of fresh water in forming the original aqueous suspension of calcined dolomite, preparatory to making the initial carbonation and separation of magnesia from lime. The cycle is then continued, as before.

In such manner, there has been made "85% magnesia" of density, that is, overall or apparent density, as low as 10 pounds to the cubic foot and yet of good strength adequate to permit safe handling, shipment, and use.

It will be understood that the details given are for the purpose of illustration, not restriction, and that variations within the spirit of the invention are to be included within the scope of the appended claims.

What I claim is:

1. The method of manufacturing magnesia insulation which comprises forming an aqueous solution of magnesium bicarbonate, heating the solution to expel carbon dioxide and form a precipitate of magnesium basic carbonate, introducing asbestos fibres and a small proportion of a water-soluble soap, to form a mixture including soap, the basic carbonate, asbestos, and water, removing water from and shaping the said mixture, and drying the shaped product, the said heating to expel carbon dioxide and precipitate basic carbonate being conducted at a maximum temperature not in excess of 200° F., to cause the precipitate to be predominantly non-crystalline in nature.

2. Thermal insulation including basic magnesium carbonate and asbestos fibres distributed as reenforcement therethroughout, having a relatively low apparent density for a given strength, and being substantially identical with the product resulting from following the method described in claim 4.

3. In manufacturing magnesia insulation, the method which comprises calcining dolomite to form mixed magnesium and calcium oxides, forming a suspension of the said oxides in a large proportion of water, passing carbon dioxide into the said suspension and thus largely converting the magnesium oxide to dissolved magnesium bicarbonate and leaving the calcium oxide in the form of undissolved calcium carbonate, separating the carbonated suspension to form a clarified solution of magnesium bicarbonate, heating the said solution at a maximum temperature not in excess of 200° F., to expel carbon dioxide and precipitate a portion of the magnesium as magnesium basic carbonate predominantly in non-crystalline form, admixing asbestos fibres to form a mixture including magnesium basic carbonate, asbestos and a solution of the unprecipitated portion of the magnesium bicarbonate, filtering the said mixture, to form a shape-retaining mass in the filter and a filtrate including the unprecipitated magnesium bicarbonate, drying and finishing the said mass into insulation of the approximate shape and dimensions desired, returning the said filtrate to a batch of calcined dolomite, as a substitute for an approximately equal proportion by volume of water used in making the initial suspension, forming a new suspension and repeating the cycle, whereby the unprecipitated portion of the magnesium compounds is saved and there is made a light, strong magnesia insulation.

4. The method of manufacturing magnesia insulation which comprises forming a mixture including magnesium oxide or hydroxide suspended in a large volume of water, carbonating the mixture to convert the said oxide largely to magnesium bicarbonate in dissolved condition, heating the resulting solution at a maximum temperature not substantially in excess of 200° F., to expel carbon dioxide and precipitate magnesium basic carbonate predominantly in non-crystalline form, introducing asbestos fibres, removing water from and shaping the resulting mixture, and drying the shaped product.

5. The method described in claim 4 including the step which comprises cooling the mixture including the basic carbonate promptly after the formation of the said carbonate, so that formation and growth of crystals of the said carbonate are minimized.

6. The method described in claim 4 including the step which comprises discontinuing the heating while a large proportion of the total magnesia remains in the form of dissolved magnesium bicarbonate.

7. The method described in claim 4 including the step which comprises adding a small proportion of a water soluble soap to the mixture including the magnesia and water and conducting the heating, to expel carbon dioxide and precipitate basic carbonate, in the presence of the said soap.

LEWIS B. MILLER.